United States Patent [19]
Leonard

[11] 3,771,407
[45] Nov. 13, 1973

[54] RHYTHM PRACTICE CONSOLE

[76] Inventor: Verna M. Leonard, 76353 N. Blackstone, Fresno, Calif. 93721

[22] Filed: Aug. 18, 1972

[21] Appl. No.: 281,709

[52] U.S. Cl. .................................. 84/484, 84/404
[51] Int. Cl. .......................................... G10b 15/00
[58] Field of Search .......................... 84/404–405, 84/465, 467, 477, 484

[56] References Cited
UNITED STATES PATENTS
2,647,430   8/1953   Schilling .......................... 84/405
2,902,897   9/1959   Volge .............................. 84/404

FOREIGN PATENTS OR APPLICATIONS
597,169   3/1960   Canada .............................. 84/484

Primary Examiner—Richard B. Wilkinson
Assistant Examiner—Lawrence R. Franklin
Attorney—Roy L. Knox

[57] ABSTRACT

Apparatus for instruction and practice in musical rhythm, tempo, beats and the like, including that in relation to percussion instruments and dance rhythms, operated by the fingers and capable of relatively loud and sharp auditory signals in the electrified form which also includes means to produce a light flash, synchronized with each sound produced, to add the visual impression as a teaching technique and for dramitization of the development of skill in achieving accurate periodicity or timing in both simple and more complex musical rhythms and dance steps.

8 Claims, 5 Drawing Figures

PATENTED NOV 13 1973　　　　　　　　　　　　　　　3,771,407
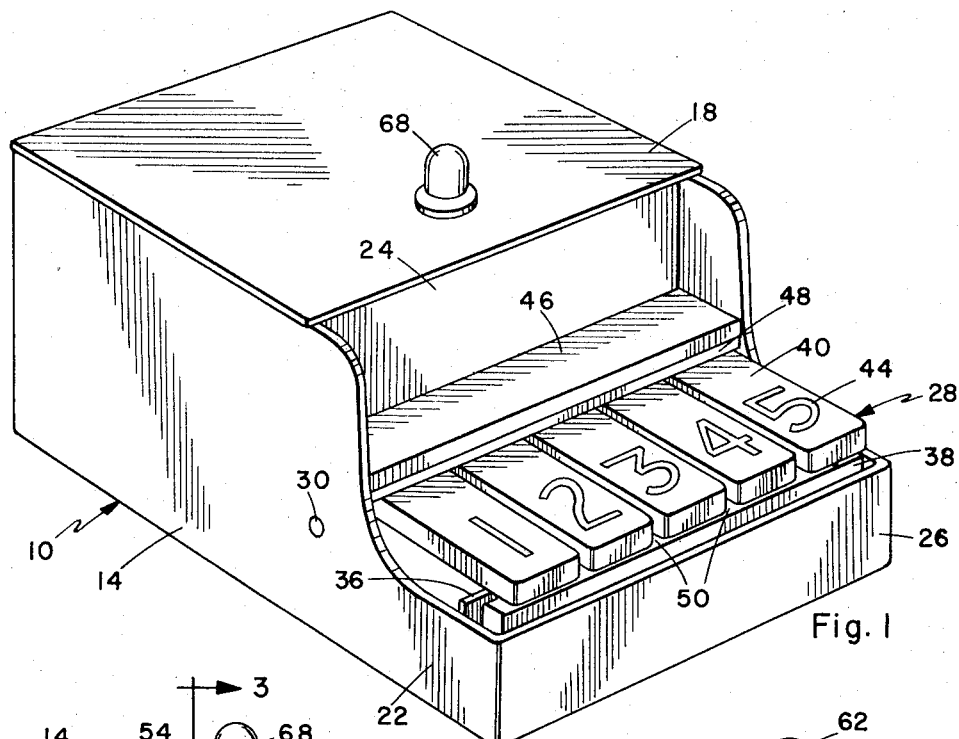
Fig. 1
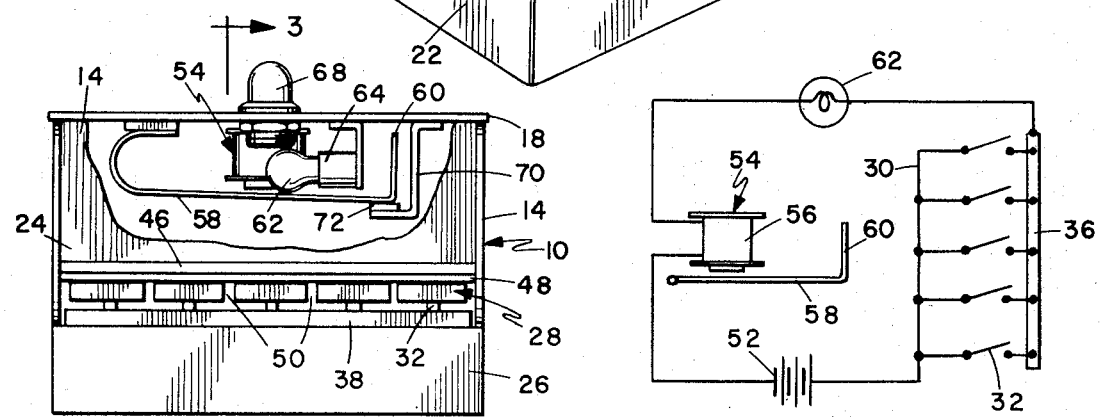
Fig. 2　　　Fig. 5
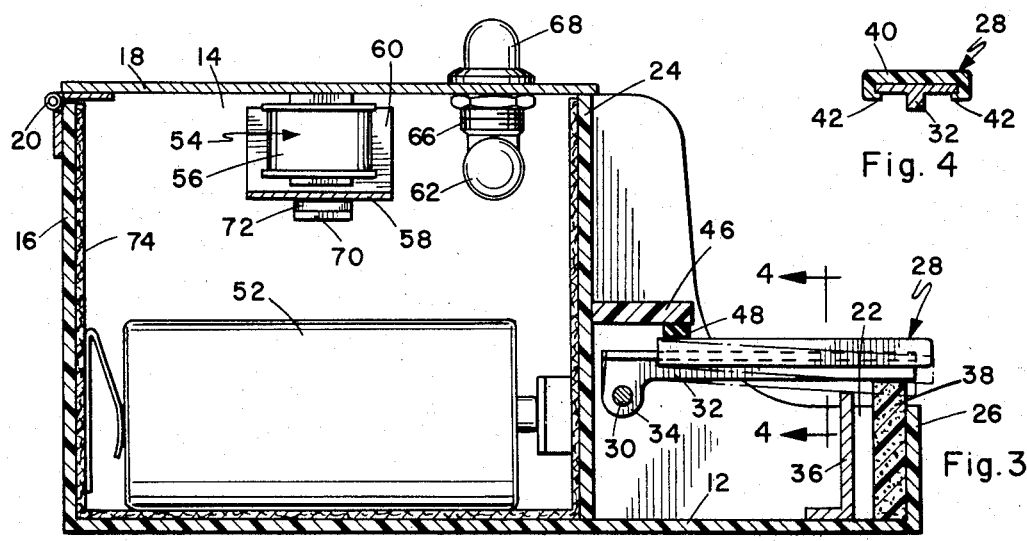
Fig. 4
Fig. 3

RHYTHM PRACTICE CONSOLE

BACKGROUND OF THE INVENTION

Complex rhythms, let alone simple rhythms, are often quite difficult for people to recognize and in fact often never learned. In the past, especially in dance instruction, toe tapping has been widely used and some music teachers use "table tappin" with the finger to demonstrate rhythms, with the student encouraged to follow with his own fingers, often in a specified order such as "thumb, third, fifth" on the right hand and "fifth, third, thumb" on the left hand. However, the toes or finger tips may produce a sound of somewhat indistinct and non-crisp character difficult for both student and teacher to assess accurately especially in group instruction. Combination of visual signal with the auditory in such a device is not known in the prior art.

SUMMARY OF THE DISCLOSURE

As claimed, this device comprises a frame with finger-operated keys suggestive of a keyboard and aligned along a pivot member with a sounding bar underneath the keys which is struck by the keys directly and individually, the keys being returned to normal or neutral position by a resilient member compressed by the keys when depressed. To accentuate the sound and to add a light flash for each depression of a key, in synchronism with the purely mechanical sound produced, the device is electrified with a lamp and sounder connected to operate when the keys, operating as switches, complete an electrical circuit including the pivot member and the sounding bar. The keys are shiftable sidewise within limits to accommodate larger or smaller hands. Since a single click and/or light flash is desired for each depression, without a noticeable accompanying secondary sound, the electrical sounder has a damper to cushion the armature-striker on the rebound. The keys are preferably numbered and the order of the numbering is changeable.

BRIEF DESCRIPTION OF THE DRAWING

FIG. 1 is a perspective view of the complete rhythm practice console;

FIG. 2 is a front elevation view thereof with a portion cut away;

FIG. 3 is an enlarged sectional view taken on line 3—3 of FIG. 2;

FIG. 4 is a sectional view taken on line 4—4 of FIG. 3; and

FIG. 5 is a schematic wiring diagram of the unit.

DETAILED DESCRIPTION OF A PREFERRED EMBODIMENT

A preferred form of the invention is that depicted in the drawing, namely an electrified apparatus which is ordinarily preferable but which is efficiently operable even if the electrical system should fail or the batteries should not be replaced when necessary.

The item is proposed as being easily portable, the frame, generally indicated by the numeral 10, being of hollow box-like character with a flat bottom panel 12, side walls 14, rear wall 16 and a hinged top panel 18, the hinge structure being indicated at 20. The side walls are reduced and extended forwardly as at 22, from a vertical center wall 24 to a front wall 26, thereby defining what may be considered the console portion proper, since it is topped by at least one key generally indicated by the numeral 28, and preferable by a keyboard-like structure comprising five such keys.

A metal cylindrical rod or pivot member 30 is terminally mounted in the side walls 14 and extends therebetween just forwardly of the center wall 24 and one practical key construction as illustrated comprises a T-bar 32 with a terminal bearing portion 34 reasonably snugly fitted onto the pivot member 30 and extending forwardly therefrom, as best indicated in FIG. 3, over and beyond a metal sounding bar 36 which is disposed so that when the key 28 is depressed the T-bar 32 strikes the sounding bar 36 to produce a sharp, metal-to-metal click sound.

When the finger releases the key 28 the key is biased to return to a neutral or normal position as by a resilient pad 38 secured just inside the front wall 26. Each key 28, as illustrated, has a facing 40 which can be formed with lateral lip flanges 42 to snap over the T-bar 32. Ordinarily there are five keys 28 and the facings 40 are numbered as indicated at 44.

A bar 46 with a resilient pad 48 may be mounted on the center wall 24 and disposed to dampen rebound of the key or keys 28. This pad 48 and the beforementioned pad 38 together tend to restrain the keys 28, in the multi-key form shown, from lateral shifting but the spaces 50 between the keys can be reduced by intentionally shifting the keys closer together to accommodate a smaller hand, since the bearings 34 are slidable on the pivot member 30. It will also be noted that the facings can be removed and replaced in re-ordered or reversed numerical sequence for use by the left hand.

Means for augmenting the sound comprises a source of electrical current indicated as a battery 52 of dry cells housed within the box-like frame and a sounder 54. The T-bars 32 of the keys 28 are switches in a circuit connecting the pivot member 30 with the battery 52, the coil 56 of the sounder 54 and the sounding bar 36 as diagrammatically shown in FIG. 5. The sounder may conveniently be mounted on the underside of the hinged top panel 18 and the armature 58 of the sounder has a terminal striker 60 which strikes the top panel making a sound which synchronizes with and augments the sound of the key striking the sounding bar 36 when the key is depressed.

A visual signal is also provided by a lamp 62 mounted in a socket 64 connected to the hinged top panel 18, which latter is apertured to receive a light tube 66 supporting a bulb terminal 68 on the outside of the hinged top panel. As indicated in the diagram of FIG. 5 the lamp 62 is also connected in series with the sounder 54 to flash in synchronism with the operation of any key 28 when the latter is depressed to function as a switch as already explained. Since an instantaneous flash with no afterglow is essential its element 62 should be a light emitting diode or the equivalent in that respect. The hinged top panel may be entirely or partially constructed of metal to enhance the sound when struck by the armature-striker 60. However, it is important to avoid a secondary sound when the armature-striker rebounds. To dampen such secondary sound a saddle or bracket element 70 with a pad 72 is positioned to be engaged by the armature 58 on rebound. The interior of the box-like frame 10 is lined with felt or the like as at 74 for the same purpose.

The operation of this invention will be clearly understood from a consideration of the foregoing and it will be evident how a person, either teacher or student, may depress the keys 28, usually in repetitive sequences involving one, two or more keys as in demonstrating and/or practicing simple or intricate rhythms. Once such a rhythm is recognized and fully mastered on the instant device, the student has reduced difficulty in implementing the developed knowledge and capability as expressed in dance rhythms and various musical expressions.

I claim:

1. A rhythm practice console for teaching and practicing musical rhythm, tempo, beats and the like, comprising:
   a frame;
   a sounding bar mounted on said frame;
   a plurality of keys shiftably mounted on said frame, each capable of being depressed by a finger of the human hand to strike said sounding bar direct-ly thus producing a sound;
   said keys having biasing means returning said keys to a neutral position when not so depressed; and
   an electric sounder mounted on said frame, said key being an electric switch closing the circuit to said sounder to augment said sound when the key is depressed.

2. A console according to claim 1 wherein said keys are mounted on a pivot member, and said biasing means is a resilient cushion adjacent to said sounding bar and extending slightly thereabove for resilient support of said key.

3. A console according to claim 2 wherein said plurality of keys are mounted in a row on said pivot member.

4. A console according to claim 3 wherein said keys are slidably adjustable on said pivot member to accommodate different hand sizes in the users of the console.

5. A console according to claim 3 wherein said keys are five in number, said keys having visually identified portions removable and replaceably mounted therein so that the order of the identified portions can be reversed for left hand fingering.

6. A console according to claim 1 and including at least one electric light signal visibly mounted on said frame and connected with said sounder to flash synchronously therewith when said key is depressed.

7. A console according to claim 1 wherein said sounder has a spring biased armature striker and a damper to quieten said armature on rebound.

8. A console according to claim 1 and wherein said plurality of keys are mounted in a row on said pivot member; said keys being electrical conductors bridging said pivot member to said sounding bar; and said pivot member and sounding bar being electrical conductors connected in series with said sounder.

* * * * *